Jan. 23, 1968  S. DE JONG ET AL  3,364,895
SUBMARINE RECOVERY SYSTEM
Filed Dec. 9, 1966  3 Sheets-Sheet 1
Fig. 1
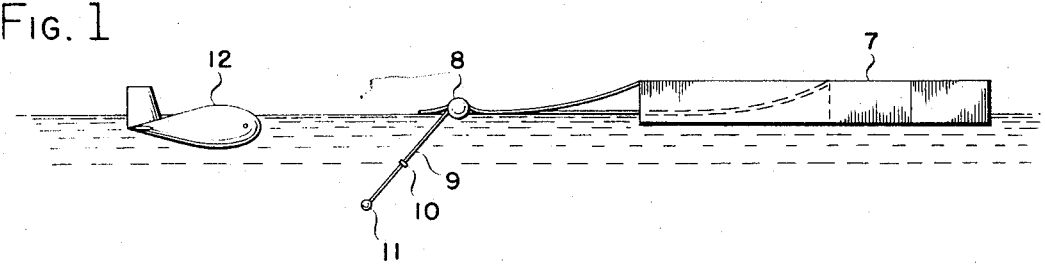
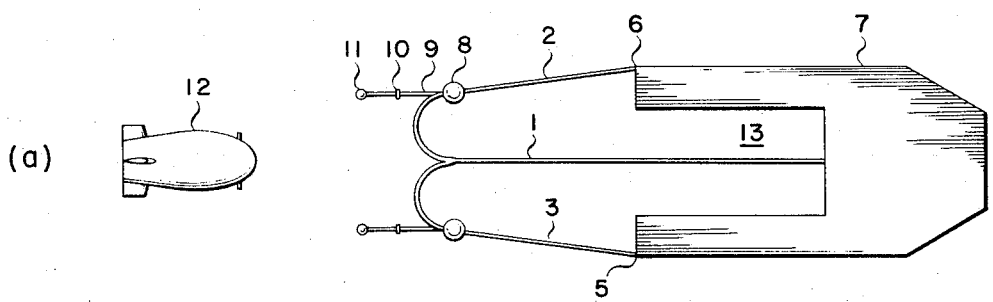
(a)
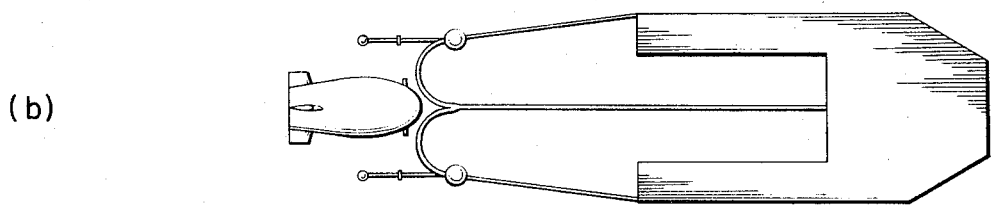
(b)
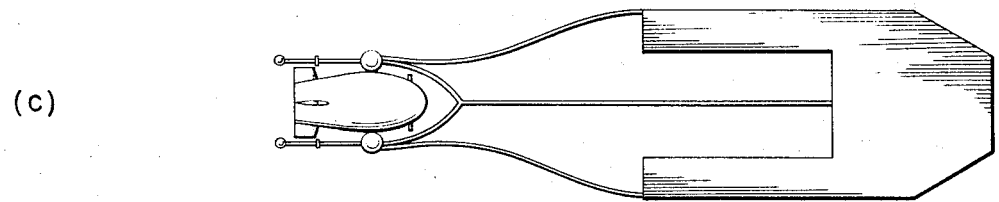
(c)
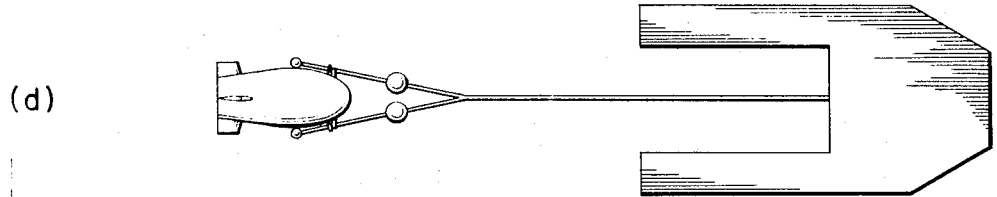
(d)
Fig. 2
INVENTORS.
SIJTZE DE JONG
CHARLES M. SNYDER
BY
Agent Jan. 23, 1968    S. DE JONG ET AL    3,364,895
SUBMARINE RECOVERY SYSTEM Filed Dec. 9, 1966    3 Sheets-Sheet 2

INVENTORS.
SIJTZE DEJONG
CHARLES M. SNYDER
BY
*George C. Sullivan*
Agent

Jan. 23, 1968 S. DE JONG ET AL 3,364,895
SUBMARINE RECOVERY SYSTEM
Filed Dec. 9, 1966 3 Sheets-Sheet 3

INVENTORS.
SIJTZE DEJONG
CHARLES M. SNYDER
BY
Agent

United States Patent Office 3,364,895
Patented Jan. 23, 1968

3,364,895
SUBMARINE RECOVERY SYSTEM
Sijtze de Jong, San Jose, and Charles M. Snyder, Saratoga, Calif., assignors to Lockheed Aircraft Corporation, Burbank, Calif.
Filed Dec. 9, 1966, Ser. No. 600,625
9 Claims. (Cl. 114—230)

ABSTRACT OF THE DISCLOSURE

A system for recovering a submarine in which three lines forming a bridle trail behind the mother vessel. The outer two lines are slackened when the submarine approaches the center line. This causes the other two lines to slacken against the submarine where they are engaged by the catch on the submarine. By reeling up the center line the submarine can be pulled up to the mother vessel.

The catch has a slot including a one-way gate for receiving the cable member. The catch is free to rotate to accommodate the cable.

Specification

This invention relates to an improved submarine recovery system, and more particularly relates to the method of recovering submarines and an improved catch built into the submarine.

In the past when it was desired to recover a submarine from an open sea divers or men in a small boat were deployed from the recovery vessel to haul the lines out into the water to the submraine to attach them thereto. This prior art system was dangerous and hazardous to life, especially in inclement weather. Moreover, the line was terminated in a hook which was inserted in an eye connected to the submarine. When the line would slacken, for example, by the rolling of the sea, the hook would sometimes disengage from the eye thus requiring the whole procedure to be started anew.

When, in the prior art, it was desired to lift the submarine from the water, the submarine had to be either towed to the site of a large crane or dry dock or a large crane had to be deployed to the location of the submarine. This is a very time-consuming and costly process.

Another difficulty encountered in the prior art devices is that they present a hazard to the hull of the craft approaching the pick-up cable and tend to become entangled easily.

Similar problems were encountered in the refueling or recovery of amphibious airplanes at sea. In U.S. Patents #2,872,890 to Kurek et al. and #2,952,237 to Reilly there is illustrated one of the prior art systems.

The patent to Reilly shows a towing rig including a pair of rigid leg members that are hinged at their forward ends and having a pick-up cable stretched between their aft ends. This towing rig also has a pair of rigid arms, each fixed to one of the rigid legs. When the keel hook on the seaplane engages the cable, the arms and legs of towing rig scissor and the forces caused by the towing of the seaplane are transmitted to the rigid legs. Thus the rigid legs must be capable of handling these large forces without buckling or otherwise permanently deforming.

The keel hook on the seaplane, as can be seen in the Reilly and the Kurek patents, is mechanically complex and requires a souce of electrical power for operation.

Although these prior art systems may have advantages for seaplanes, they are not adaptable for submersibles. A minimum of moving parts is desirable for submersibles due to the corrosive nature of the sea. Furthermore, feed-throughs for mechanical linkages and electrical wires are susceptible to leakage at the high pressures encountered at ocean depths.

The improved system according to this invention is simple in operation, can be quickly and easily launched, and offers a minimum of drag in the water.

The present invention employs a novel, simplified arrangement in which a floating lanyard assembly, including a two-legged bridle and a tow line, is trailed behind the stern of the mother vessel. When the bow of the submarine which is heading for the tow line is approximately in line with the loops on the bridle, the outboard lines are slackened, causing the loops to straddle the submarine, thus putting them in position to be gripped by the catches built into the submarine. Once the stops on the outboard lines seat in the submarine catch, the submarine can be towed to shore or hauled abroad the mother vessel, as desired.

For a better understanding of the invention, reference may be made to the accompanying drawings, in which:

FIGURE 1 illustrates an elevation of an embodiment of the recovery system showing the submarine approaching the bridle.

FIGURE 2 is a simplified representation of the process of submarine recovery.

Figure 3:
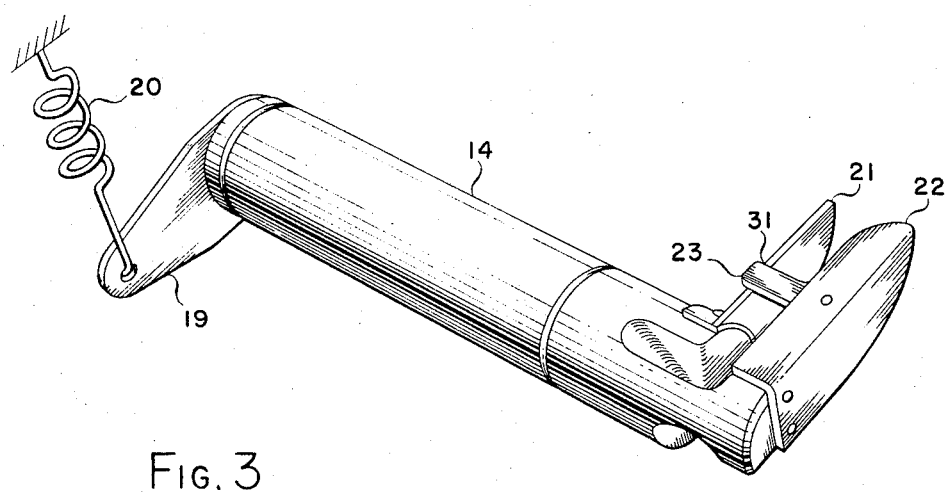
FIGURE 3 is a perspective view of the typical submarine recovery catch according to this invention.

Referring to FIGURES 1 and 2 of the drawings, there is shown a submarine recovery system in accordance with this invention. More specifically, the floating tow line 1 is attached at its aft end to a bridle having legs 2 and 3. The tow line on the first and second legs of the bridle are adjustably attached to points 4, 5 and 6, respectively, by capstan or other device, not shown, to the mother vessel, 7. A float 8 is attached to the aft end of each leg at a point approximately along-side the junction of the legs and the tow line. One of the functions of the float is to maintain the bridle in a proper recovery position. Suspended from each float is a fitting line 9, a fitting 10 and a weight 11.

For recovery, the lanyard assembly is trailed behind the mother vessel as shown in FIGURE 2(a). The submarine 12 approaches the mother vessel 7 from the stern approximately in line with tow line 1. When the submarine is approximately in the position shown in FIGURE 2(b), the float lines are slackened. This causes a change in geometry of the bridle and causes the lines to conform generally to the sides of the submarine as shown in FIGURE 2(c). When this occurs the mother vessel 7 increases its speed, or the submarine 12 decreases its speed, or both, causing the lines 9 to move forward adjacent the sides of the submarine until they are snagged by the catches on the submarine. The line continues to feed through the catch until the fitting seats on the catch.

The line 1 can now be shortened, thus pulling the submarine 12 up to the stern of the vessel 7 and, if desired, the submarine 12 can be pulled into the U-shaped stern 13 on the vessel 7.

Figure 4:
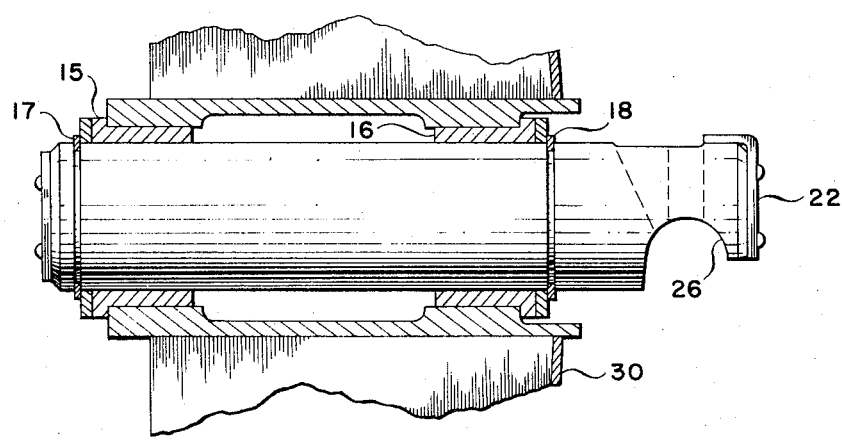
FIGURE 4 is a front view of a typical submarine recovery catch in accordance with this invention.
Figure 5:
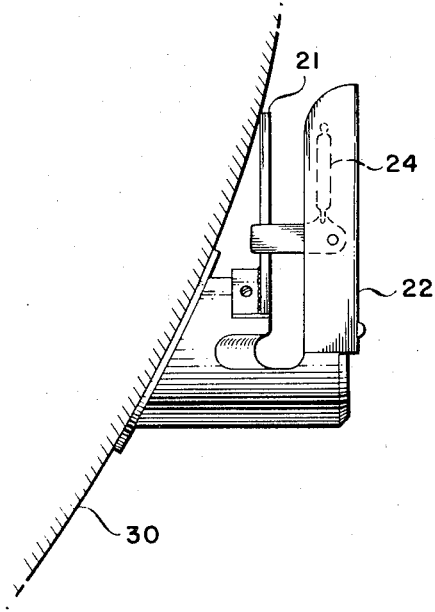
FIGURE 5 is a top view of the portion of the submarine recovery catch that protrudes from the submarine.

Referring now to FIGURES 3, 4, and 5, there is shown by way of example a typical catch such as may be employed on the submarine to engage and pick up the cable of the bridle. This catch device principally comprises a double-slotted rotatable pin 14. The pin 14 is retained in the submarine outer hull structure 30 by bushings 15 and 16 and snap rings 17 and 18. Pin 13 is rotatably mounted to allow for the variations in pull-off angle induced by the relative motions of the two vessels. To insure a proper pin position during the initial fitting line interfacing, lever 19 and a resilient member 20 are employed. Slot guides 21 and 22 are provided to guide the fitting line into the L-shaped slot 31 in the pin 14. Inadvertent disengagement is prevented by gate 23 which is held normally closed. Guides 21 and 22 are attached to pin 14 by any well-known means.

The catches protrude from the beam of the submarine, as can be readily seen from FIGURES 1 and 2.

Figure 6:
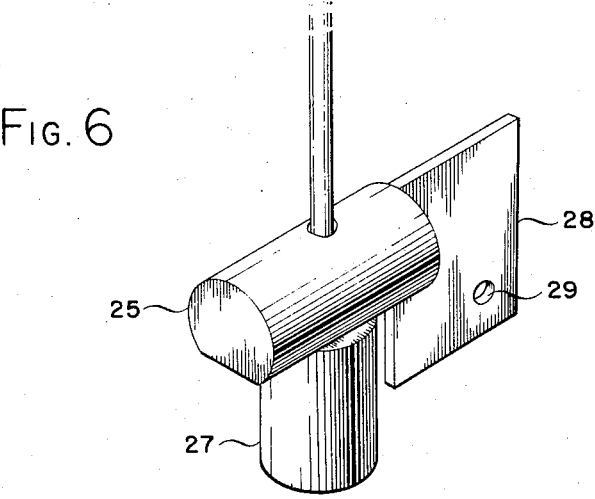
FIGURE 6 is a typical cable fitting used in cooperation with the submarine recovery catch.

FIGURE 6, by way of example, shows a typical fitting 10. The upward face 25 is cylindrical to provide a pivot point to cooperate with cylindrical surface 26 of pin 14. Fitting 10 is attached to line 9 by means of a swage sleeve or stop 27. The stop can be attached to the line by any well-known means, such as swaging, for example. A vane 28, including a connection point 29, is utilized to provide directional control of the fittings. The weight 11 is suspended below the fitting utilizing connection point 29 by any well-known means.

*Operation*

The operation of the system will now be explained in detail. When the mother vessel reaches the vicinity of the submarine, the tow line complex is deployed in the water. The mother vessel maintains forward momentum, to keep the line stretched out astern. Keeping a speed slightly above the speed of the mother vessel, the submarine heads toward the tow line from astern. When the submarine is slightly astern to the tow line, the two outside legs are slackened. The tow line is not slackened. Due to the forward motion of the mother vessel, the two legs will conform generally to the sides of the submarine. The speed of the submarine will be reduced at this time, causing the two legs to move forward relative to the sides of the submarine. This relative motion will cause the fitting lines to move into the guides and then into the L-shaped slot in the catch. Once the fitting lines have passed the gate the gate will return to its quiescent position and prevent inadvertent disengagement of the fitting lines. The fitting line will continue to slip through the slot until the fitting is seated in the curved surface on the catch. The pin can now rotate to allow the fitting to seat and to allow the line to take up its position on the angled face of the slot. The fitting line rides on the angled face of the slot because of the new Y-shaped geometry of the tow line complex. The submarine can now be towed to shore or by the mother vessel. The submarine also can be reeled into the U-shaped stern compartment on the mother vessel by reeling in the tow line on a capstan or any other well-known means.

Although the word "submarine" is used throughout the specification, this invention is not limited to recovery of only submarines but has application to other marine vessels. Therefore, it is intended that the use of the word submarine be interpreted as illustrative and not limitative.

Other modifications and advantageous applications of this invention will become apparent to those having ordinary skill in the art. Therefore, it is intended that the matter contained in the foregoing description and the accompanying drawings be interpreted as illustrative and not limitative, the scope of the invention being defined in the appended claims.

I claim:

1. A lanyard assembly for use in a marine vessel recovery system comprising a tow line and a bridle having a first and second leg, one end of each of said legs being bifurcated to form two branches, one end of said tow line being attached to a branch of each of the said legs, the other branch of each of said legs having a catch engaging fitting attached thereto, a first and second float means, each of said float means affixed, respectively, to one of said legs in the vicinity of the point of bifurcation.

2. A lanyard assembly according to claim 1 wherein said first and second fittings each comprise a cylindrical shaped member having a portion of the cylindrical surface flattened, a stop, and a vane, said vane being affixed to one end of said cylindrical shaped member, said stop being affixed to said flattened portion of said cylindrical shaped member.

3. A lanyard assembly according to claim 1 wherein the other end of said tow line is adjustably attached to the aft end of a mother vessel, the other end of said first leg of said bridle being attached to said mother vessel on one side of said tow line, the other end of said second leg of said bridle being attached to said mother vessel on the other side of said tow line.

4. A marine recovery system according to claim 3 further including a marine vessel having at least one towing catch for corporating with and connectively interacting with at least one of said fittings, whereby as said towing catch and said fitting engage, the marine vessel is placed in tow and adapted to be secured to said mother vessel.

5. A marine recovery system according to claim 4 in which said catch comprises a pin pivotally mounted on the hull of said marine vessel, said pin having a portion extending outwardly from said hull, said portion having a concave surface, an L-shaped slot, and first and second generally flat guide means, said first guide means connected to and extending perpendicularly from and rearwardly of said pin and corporating with said L-shaped slot, said second guide means having a portion substantially parallelly juxtaposed to said first guide means and extending generally rearwardly from said L-shaped slot.

6. A towing catch for marine vessels or the like comprising a pin pivotably mounted on the hull of said marine vessel, said pin having a portion extending outwardly from said hull, with a concavity in the lower surface thereof in the vicinity of the outward end of said pin, an L-shaped slot, and a first and second guide means, said first guide means attached to said pin and being juxta-positioned with said L-shaped slot, said second guide means having a portion substantially juxtaposed with said first guide means and in corporative relationship with said L-shaped slot.

7. A towing catch for marine vessels or the like according to claim 6, wherein said second guide means includes a gate pivotably secured thereto and extending across the slot formed between said first and second guide means.

8. The method of recovering a marine vessel comprising the steps of deploying a lanyard behind a mother ship, said lanyard comprising a tow line, and a bridle having two legs respectively positioned on opposite sides of said tow line, the aft end of each of said legs being bifurcated to form two branches, the aft end of said tow line being attached to a branch from each of said legs, the other branch of each of said legs extending downwardly and having catch engaging fittings attached thereto, a first and second float means affixed to one of said legs near the point of bifurcation, the forward end of said two legs and said tow line being attached to the aft portion of said mother ship, approaching the lanyard from astern generally between the downwardly extending branches with a marine vessel having two towing catches for corporating with said fittings, slackening the legs of the bridle when the bow of the marine vessel is slightly astern of the tow line, thus causing the said legs of said bridle to conform generally to the sides of the marine vessel, engaging each of the said downwardly extending branches and the said fittings, seating the fitting on the catch by relative motion between the mother vessel and the marine vessel and whereby the marine vessel may be adjustably secured to the mother ship.

9. The method of recovering a marine vessel as defined in claim 8 including the further step of hauling the marine vessel into a U-shaped stern compartment by reeling in said tow line.

References Cited
UNITED STATES PATENTS

| | | | |
|---|---|---|---|
| 1,853,794 | 4/1932 | Arman | 114—235 |
| 2,905,127 | 9/1959 | Ohlson et al. | 114—230 X |
| 3,155,609 | 11/1964 | Ross et al. | 114—230 |

FERGUS S. MIDDLETON, *Primary Examiner.*

TRYGVE M. BLIX, *Examiner.*